United States Patent [19]

De Angelis et al.

[11] Patent Number: 5,206,948
[45] Date of Patent: Apr. 27, 1993

[54] BUS MONITOR WITH MEANS FOR SELECTIVELY CAPTURING TRIGGER CONDITIONS

[75] Inventors: Douglas J. De Angelis, Woburn; Henry W. J. Maddox, Franklin; Arthur Peters, Sudbury; Donald J. Rathbun, Methuen; William L. Saltmarsh, Brockton, all of Mass.

[73] Assignee: Bull HN Information Systems Inc., Billerica, Mass.

[21] Appl. No.: 455,666

[22] Filed: Dec. 22, 1989

[51] Int. Cl.[5] .......................................... G06F 11/34
[52] U.S. Cl. ..................................... 395/575; 371/19
[58] Field of Search ................... 371/19.1, 15.1, 16.1; 364/200 MS File, 900 MS File

[56] References Cited

U.S. PATENT DOCUMENTS

| | | | |
|---|---|---|---|
| 4,100,532 | 7/1978 | Farnback | 340/146.3 MA |
| 4,429,368 | 1/1984 | Kurii | 371/19 |
| 4,571,672 | 2/1986 | Hatada et al. | 364/200 |
| 4,636,940 | 1/1987 | Goodwin, Jr. | 371/19 |
| 4,707,834 | 11/1987 | Frisch et al. | 371/20 |
| 4,713,813 | 12/1987 | Sugimori et al. | 371/15 |
| 4,852,095 | 7/1989 | Multzer | 371/26 |
| 4,930,070 | 5/1990 | Yonekura et al. | 364/200 |
| 4,937,740 | 6/1990 | Agarwal et al. | 364/200 |
| 4,953,167 | 8/1990 | Byers et al. | 371/16.5 |
| 4,982,387 | 1/1991 | Trent | 368/117 |

Primary Examiner—Robert W. Beausoliel, Jr.
Assistant Examiner—Phung M. Chung
Attorney, Agent, or Firm—Gary D. Clapp; John S. Solakian

[57] ABSTRACT

A monitoring means for selectively detecting and recording signals representing at selected points within a system, includes trigger generation logic responsive to selected bus signals for generating trigger signals representing the occurrence of selected conditions, and a recording memory for recording the conditions thereupon, a trigger selection logic for selecting trigger outputs corresponding to the trigger signals. The trigger selection logic includes a trigger enabling memory for storing selectable trigger enabling codes, wherein each enabling code corresponds to a trigger signal, and trigger output logic responsive to the trigger enabling codes and to the trigger signals for providing trigger outputs. The trigger enabling codes include bus enabling codes representing selected conditions on a bus of the system, trigger sequence enabling codes corresponding to sequential combinations of trigger signals and external trigger enabling codes corresponding to triggers external to the system. The enabling codes may select trigger signals to be used in logical AND or OR functions in generating a trigger output or in substitution for a bus trigger signal.

32 Claims, 3 Drawing Sheets

BUS MONITOR WITH MEANS FOR SELECTIVELY CAPTURING TRIGGER CONDITIONS

CROSS REFERENCES TO RELATED APPLICATIONS

The present patent application is related to copending U.S. patent application Ser. No. 07/455,664, for Bus Monitor With Dual Port Memory For Storing Selectable Trigger Patterns, by Douglas J. DeAngelis, Henry W. Maddox, Arthur Peters, Donald J. Rathbun and William L. Saltmarsh; Ser. No. 07/455,667 for Bus Monitor With Selective Capture Of Independently Occurring Events From Multiple Sources, by Douglas J. DeAngelis, Henry W. Maddox, Arthur Peters, Donald J. Rathbun and William L. Saltmarsh; and Ser. No. 07/455,668, for Bus Monitor With Time Stamp Means For Independently Capturing And Correlating Events, by Douglas J. DeAngelis, Henry W. Maddox, Arthur Peters and Donald J. Rathbun, which are filed concurrently with the present patent application on Dec. 22, 1989 and assigned to the assignee of the present patent application.

BACKGROUND OF THE INVENTION

1. Field of Use

The present invention relates to monitoring the operation of computer systems and, more particularly, to apparatus and methods for selectively capturing trigger conditions.

2. Prior Art

A recurring problem in monitoring the performance and operation of computers system, for example, on a computer system bus during operation, is the ability of the user of a monitoring apparatus to selectively capture the conditions to be monitored and detected. For example, the user of a monitoring apparatus of the prior art generally has the ability to capture all of the events occurring within a given time after initiation of the monitoring process, be not the ability to selectively information related to specific, selected events that might occur at any time after start of the monitoring. That is, the monitoring apparatus of the prior art operates in much the same manner as a tape recorder, turn it on and it records everything that happen until it runs out of tape. Unless, therefore, the storage capabilities of a monitoring device are impracticably large, the user has difficulty in capturing events that may occur only at infrequent intervals or only long after the monitoring process has started and may not, in fact, capture the events of interest because the monitoring device's data recording apparatus becomes saturated, or filled, with data. This is particularly true in the case of events which are either intermittent, such as certain types of failures, or which happen only infrequently in the normal operation of a system. In addition, and contributing to the problem, the monitoring devices of the prior art are generally not capable of selectively defining and capturing events of interest, but must capture much data which is not of interest in order to capture the data that is of interest, and cannot monitor events from a variety of sources, making repetitive monitoring operations necessary to establish correlations between events at various sources.

SUMMARY OF THE INVENTION

The present invention provides a monitoring means for selectively detecting and recording conditions at selected points within a system during operation, including a trigger generation means connected from first selected points and responsive to selected conditions thereupon for generating trigger signals representing the occurrence of corresponding selected conditions and a recording memory means connected from second selected points and responsive to trigger outputs for recording the conditions present at the second selected points. In particular, the present invention provides a means for selecting the trigger outputs corresponding to the trigger signals, comprising a trigger enabling memory for storing a plurality of selectable trigger enabling codes, wherein each enabling code corresponds to a trigger signal representing the occurrence of a corresponding condition to be detected. The trigger output means is responsive to the trigger enabling codes and to the trigger signals for providing trigger outputs upon the occurrence of a trigger signal corresponding to a selected trigger enabling code.

The first selected points may include the lines of a first bus of the system, signals indicating the presence of an illegal condition on a bus of the system, and signals from points external to the buses of the system.

The second selected points may include the lines of the first bus of the system, the lines of a second bus of the system, and a set of points external to the first and second buses of the system.

The trigger enabling codes include a plurality of bus enabling codes, wherein each of the bus enabling codes corresponds to one of a plurality of bus trigger signals, and each of the bus trigger signals represents a selected condition on a bus of the system. One of the bus trigger signals occurs upon each cycle of operation of the bus and a corresponding bus enabling code enables a trigger output upon each bus cycle.

The trigger enabling codes may also include a plurality of trigger sequence enabling codes, wherein each of the trigger sequence enabling codes corresponds to a sequential combination of a first trigger signal and a second trigger signal, wherein a trigger sequence enabling code will enable a trigger output upon the condition that the first trigger signal occurs before the second trigger signal. A group of trigger sequence enabling codes set to the enabling state and defining a corresponding group of sequentially defined trigger signals will enable a trigger output upon the occurrence of the trigger signals in the sequence defined by the trigger sequence enabling codes.

The trigger enabling codes may further include a plurality of external trigger enabling codes, wherein each external trigger enabling code corresponds to one of a plurality of external triggers from a source other than a bus of the system. Further, each external trigger enabling code and corresponding external trigger signal correspond to one of the bus enabling codes and corresponding bus trigger signal. The bus enabling codes and external trigger enabling codes may select an external trigger signal to be used in substitution for the corresponding bus trigger signal in generating a trigger output.

In addition, the bus enabling codes and trigger sequence enabling codes may select an external trigger signal to be used in a logical AND function with the corresponding bus trigger signal in generating a trigger output, or in a logical OR function with the corresponding bus trigger signal in generating a trigger output. The bus enabling codes and trigger sequence enabling codes may also select an external trigger signal to be used in substitution for the corresponding bus trigger signal in generating a trigger output upon the occurrence of a condition defined by one or more trigger sequence enabling codes.

It is thereby an object of the present invention to provide an improved system monitoring means having a means for selectively capturing trigger conditions representing conditions occurring in the system during operation.

The foregoing and other objects, features and advantages of the present invention will be apparent from the following description of the invention and embodiments thereof, as illustrated in the accompanying figures, wherein:

DESCRIPTION OF PREFERRED EMBODIMENTS

A. General Description (FIG. 1)

Figure 1:
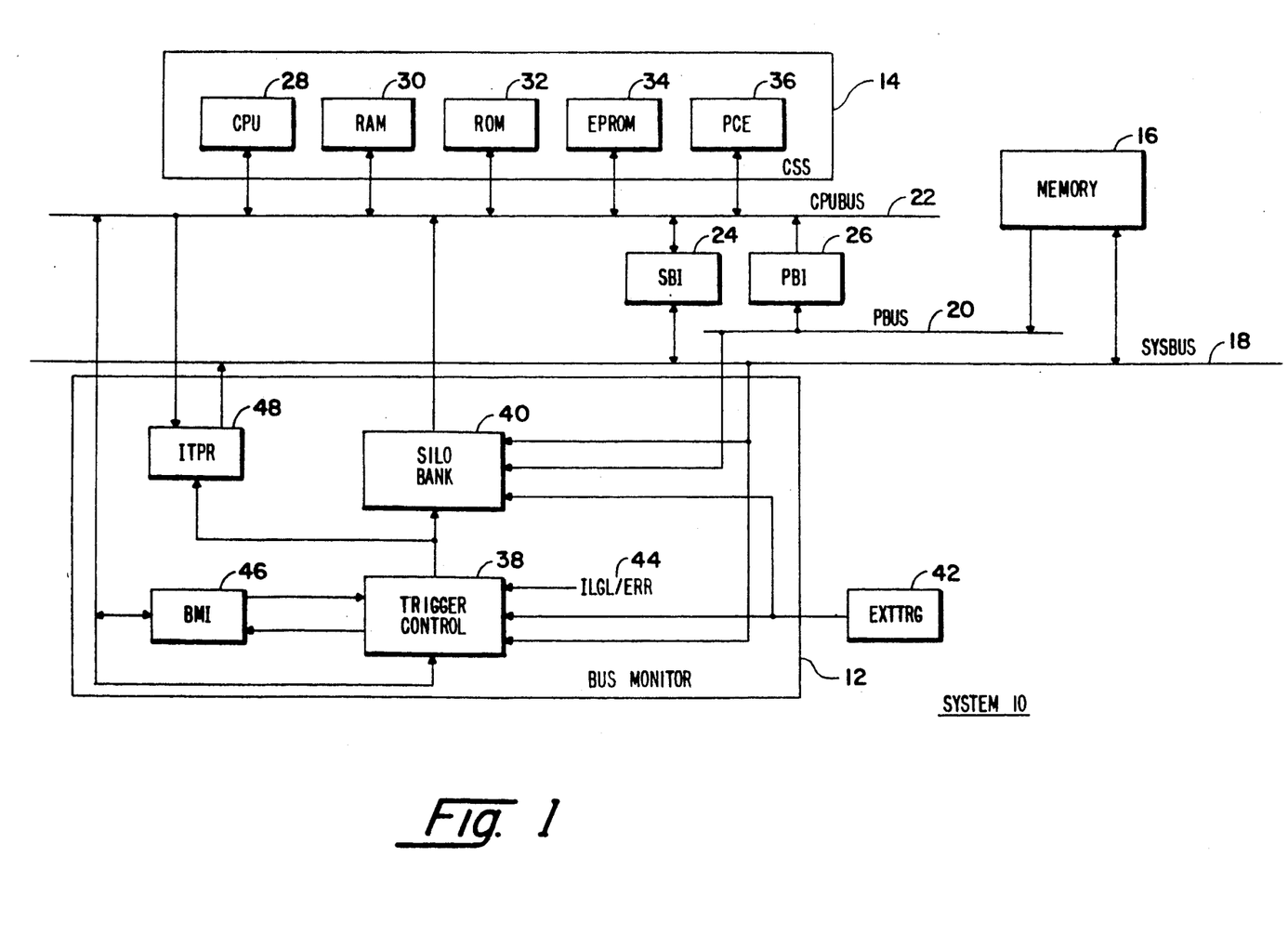
FIG. 1 is a block diagram of a system incorporating the bus monitor of the present invention.

Referring to FIG. 1, therein is represented a block diagram of an exemplary System 10 incorporating a Bus Monitor 12 of the present invention. As shown, System 10 includes at least one Central System 14, which performs information processing operations, and a Memory 16 for storing programs and data. CSS 14, Memory 16 and other elements of the system, such as other Central Systems and memories, and input and output controllers, through a System Bus (SYSBUS). System buses such as SYSBUS 18 are well known in the art and an example of such could be the MEGABUS* (*MEGABUS is a trademark of Bull HN Information Systems Inc.) used in Bull HN Information System's DPS6 and MRX computer systems. In addition, System 10 includes a Private Bus (PBUS) which is connected between Memory 16 and CSS 14 and which is used solely to communicate information, that is, program instructions and data, from Memory 16 to CSS 14. While not a part of or a limitation of the present invention, PBUS 20 is representative of the special purpose buses often found in computer systems and, in System 10, is provided to enhance the speed with which information may be read from Memory 14 to CSS 12. In system 10, memory write operations are executed completely on SYSBUS 18 in the usual manner and certain memory read operations may be executed entirely through SYSBUS 18 in the usual manner. Many memory read operations, however, are of blocks of words, for example, of blocks of eight double words. In these block read operations, the read command and starting address of the block to be read are provided to Memory 16 through SYSBUS 18, in the usual manner for a read operation, and the block of words is then read from Memory 16 to CSS 14 through PBUS 20 as a burst of eight double words. The speed of the block read operation is thereby enhanced by avoiding the more complex and slower protocols used in communicating through general purpose SYSBUS 18.

As shown in FIG. 1, CSS 14 has associated with it a Central Processing Unit Bus (CPUBUS) 22 for communication among the elements of CSS 14 and both SYSBUS 18 and PBUS 20 communicate with CPUBUS 22 through, respectively, a bidirectional SYSBUS Interface (SBI) 24 and a unidirectional PBUS Interface (PBI) 26.

CSS 14 is in turn comprised of a number of elements, including a Central Process Unit (CPU) 28 which, in the present embodiment of System 10, may be an Intel 80386 microprocessor, which is well known to those of ordinary skill in the art. CPUBUS 22 accordingly is a standard 32 bit 80386 bus using the 80 386 data, instruction and command formats and executing the 80386 bus protocols and procedures.

Associated with CPU 28 are a local Random Access Memory (RAM) 30 for use by CPU 28, such as storing data and instructions, a Read Only Memory (ROM) 32 used, for example, to store system boot programs, and an Erasable Programmable Read Only Memory (EPROM) 34 which is related to Bus Monitor 12 and will be discussed further below. Finally, CSS 14 includes a number of other CPU 28 related elements, generally referred to as Process and Communication Elements (PCE) 36, which may include such well known functions as interrupt handling logic and communications controllers, such as disk drive controllers and serial and parallel port controllers.

Referring now to Bus Monitor 12, as previously described, the function of Bus Monitor 12 is to continuously monitor the conditions present at a first set of selectable monitored points while System 10 is in operation. As will be described, those points include System 10's buses, most particularly SYSBUS 18, and may include Memory 16 and certain other selected points inside or outside System 10.

Should Bus Monitor 12 detect any of a number of preselected trigger conditions occurring at one or more of this first set of points, Bus Monitor 12 will generate a trigger output indicating the occurrence of that condition. Such a condition, or a selectable time sequence of such triggers, will cause the sampling and storing of the states then present at a second set of selectable sampled points for subsequent examination. As will be described, the second set of points may include some or all of the first set of points, such as the signals present on SYSBUS 18, and may include further points in System 10, such as PBUS 20.

The major functional blocks of Bus Monitor 12 include a Trigger Control 38 and a Silo Bank 40. Trigger Control 38 has inputs comprising the first set of monitored conditions. As indicated, these Trigger Control 38 inputs are connected from SYSBUS 18, from selectable External Triggers (EXTTRG) 42, and from Illegal/Error Condition Triggers (ILGL/ERR) 44. As will be described, Trigger Control 38 is programmable to detect certain conditions, that is, combinations, patterns or sequences of states or signals occurring in the monitored inputs, and to generate corresponding trigger outputs indicating the detection of one or more of the programmably selected conditions. These triggers may be used directly to initiate the sampling of the conditions then present on the monitored points of System 10, or Trigger Control 38 may also be programmed to generate an output upon a selected time sequential occurrence of triggers.

Bus Monitor 12 is programmed through CSS 14 and, as shown, Trigger Control 38 is bidirectional connected to CPUBUS 22 through Bus Monitor Interfaces (BMI) 46. This connection allows CSS 14 to write selected trigger conditions into Trigger Control 38 and to read the state of Trigger Control 38.

Silo Bank 40 comprises the memory for storing, or recording, the sampled conditions present in System 10 when a trigger condition is detected by Trigger Control 38 and accordingly has a sample control input connected from Trigger Control 38. The data inputs of Silo Bank 40 are connected from the second set of selected sample points and include, as shown in FIG. 1, the data, command and address lines of SYSBUS 18, the lines of PBUS 20, the set of selectable external points from EXTTRG 42. As will be described, the sample inputs of Silo Bank 40 further include a time stamp generated by Trigger Control 38.

Silo Bank 40 in turn has data outputs connected to CPUBUS 22, so that the contents of Silo Bank 40 may be read to CSS 14 for examination or transfer to other destinations, such as a remote monitoring facility.

Finally, Bus Monitor 12 has a set of Interrupt/Pattern Programmable Registers (IPPR) 48 connected from CPUBUS 22 and to SYSBUS 18. In a first mode, IPPR 48 is used by CSS 14 to test SYSBUS 18 and system elements connected from SYSBUS 18 by allowing CSS 14 to write test patterns onto SYSBUS 18 through IPPR 48 under the control of CSS 14. In the bus monitor related mode, CSS 14 may write selected commands into IPPR 48, such as a system or CPU interrupt command, and store the command in IPPR 48 until the command is written onto SYSBUS 18 by the occurrence of a trigger output from Trigger Control 38.

Having described the overall structure and operation of a System 10 incorporating a Bus Monitor 12 of the present invention, and the general structure and operation of Bus Monitor 12, the following will describe Bus Monitor 12 in further detail.

B. Bus Monitor 12 (FIG. 2)

B.1 Silo Bank 40

Figure 2:
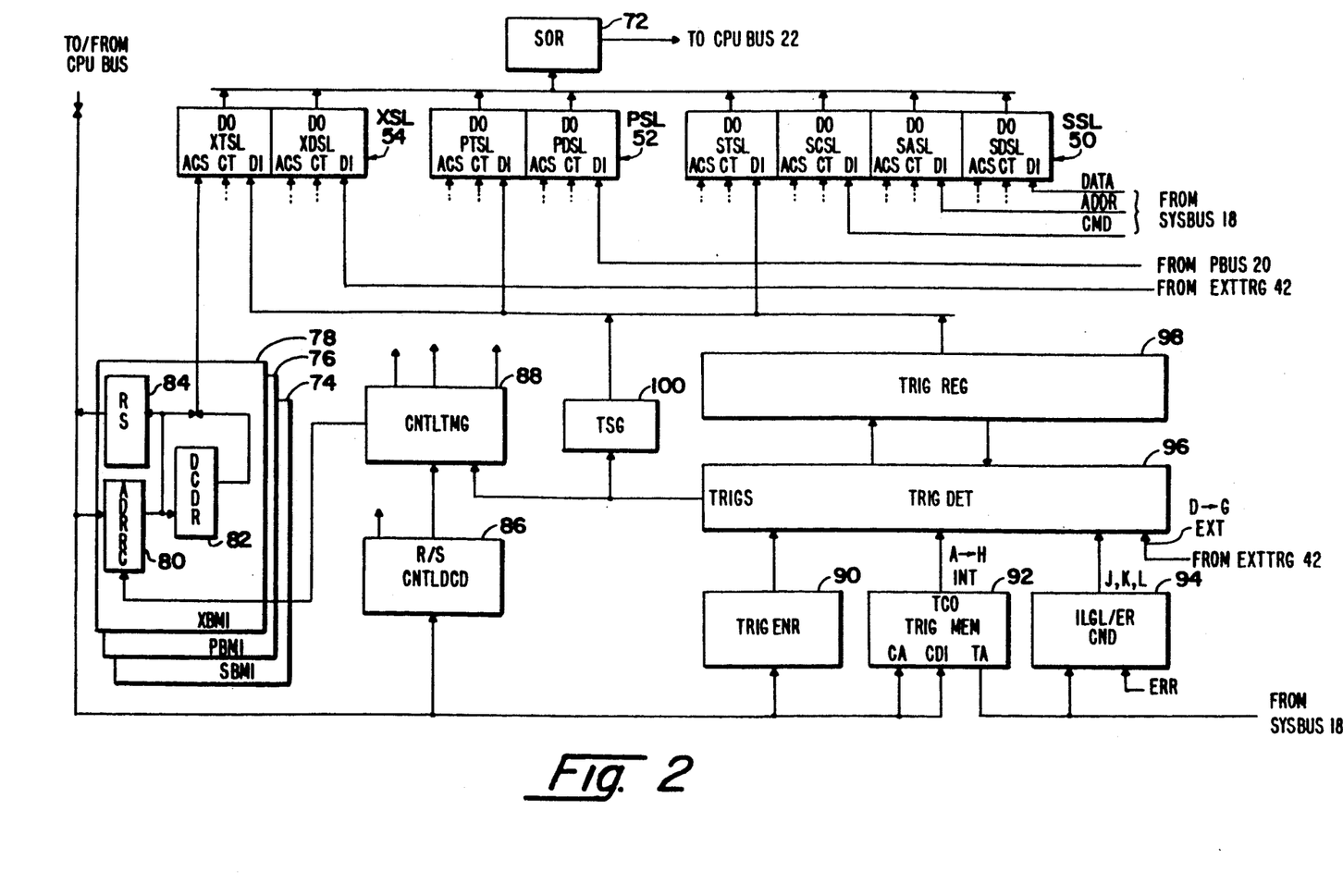
FIG. 2 is a block diagram of the bus monitor of the present invention.

Referring to FIG. 2, therein is shown a more detailed block diagram of Bus Monitor 12, with the exception of IPPR 48.

Located across the top of FIG. 2 is Silo Bank 40 which, as show,, is comprised of three sub-silos, each corresponding to a point in System 10 whose condition, or state, is to be recorded upon the occurrence of a corresponding trigger output from Trigger Control 38. As shown, these sub-silos comprise a SYSBUS Silo (SSL) 50, a PBUS Silo (PSL) 52, and an External Trigger Silo (XSL) 54. Each of these sub-silos is in turn comprised of three silo seqments, each segment being assigned to the recording of a particular set of conditions from the corresponding point in System 10. As shown, SSL 50 is comprised of a SYSBUS Data Silo (SDSL) 56, a SYSBUS Address Silo (SASL) 58, a SYSBUS Command Silo (SCSL) 60, and a SYSBUS Time Stamp Silo (STSL) 62. PSL 52 is comprised of a PBUS Data Silo (PDSL) 64 and a PBUS Time Stamp Silo (PTSL) 66 while XTSL 54 is comprised of an External Data Silo (XDSL) 68 and an External Time Stamp Silo (XTSL) 70.

SDSL 56, SASL 58, SCSL 60 and STSL 62 have data inputs connected from, respectively, the data, address and command lines of SYSBUS 18 and the output of a time stamp generator. PDSL 64 and PTSL 66 have data inputs connected from, respectively, the lines of PBUS 20 and the time stamp generator, while XDSL 68 and XTSL 70 have data inputs connected, respectively, from the external sample points, for example, EXTTRG 42, and, again, the time stamp generator. The data inputs of SSL 50, PSL 52 and XSL 54 are also connected, as described=bed further below, from Trigger Control 38, so that SSL 50, PSL 52 and XSL 54 may receive and store the triggers initiating the sampling operations, and information relating to the triggers initiating the sampling operations.

The data outputs (DOs) of SSL 50, PSL 52 and XSL 54 are, as shown, connected in parallel to the data inputs of Silo Output Register (SOR) 72 and the data outputs of SOR 72 are connected in turn to CPUBUS 22. As will be described further, CSS 14 may address and read the contents of any of SSL 50, PSL 52 or XSL 54 to CPUBUS 22 through SOR 72.

In the present embodiment of Bus Monitor 12, SSL 50, PSL 52 and XSL 54 are comprised of video RAMs (Random Access Memories), such as are used in personal computers to store and provide the video display outputs. As is known, video RAMs are comprised of two memory components, the first being a large, relatively slow dynamic memory used to store large volumes of information, such as graphics to be displayed on a display screen, and a smaller and much faster static memory. In normal use, data is written into the dynamic memory portion of a video RAM at a relatively low speed, is subsequently and selectively transferred into static memory portion of the RAM, and read from the static memory portion at a much higher speed, for example, to a graphics display unit. In Bus Monitor 12, however, data is read at high speed into the dynamic memory portion of the video RAM, thereby allowing high speed capture of information present on the monitored points of System 10, such as SYSBUS 18 and transferred into the much larger though slower memory comprised of the dynamic memory portion of the video RAM, from which it may be subsequently read at much lower speeds. The use of video RAMs for Silo Bank 40 thereby provides a memory unit having high speed write and data capture capabilities, in the static memory portion of the video RAM, combined with the high storage volume and low costs of the dynamic memory portion of the video RAM.

B.2 BMIs 46

Located in the lower left corner of FIG. 2 are BMIs 46 which, as shown, are comprise a SYSBUS BMI (SBMI) 74, a PBUS BMI (PBMI) 76, and an External BMI (XBMI) 78 which provide interfaces between CPUBUS 22 and, respectively, SSL 50, PSL 52 and XSL 54. SBMI 74, PBMI 76 and XBMI 78 are essentially identical and each includes an Address and Register Counter (ADRRC) 80 which has data inputs connected from CPUBUS 22 and a clock input connected from the read/write control and timing circuitry for Silo Bank 40. As will be described further, the ADRRC 80's generate and provide read and write addresses to Silo Bank 40 and may be loaded with addresses from CSS 14, for example, to select information to be read from Silo Bank 40 and to initialize the starting addresses at which sampled information is written into Silo Bank 40. The ADRRC 80 clock inputs from the read/write timing and control circuitry are primarily used to generate successive write addresses for writing sampled information into Silo Bank 40.

Each of SBMI 74, PBMI 76 and XBMI 78 also includes a Decode Register (DCDR) 82 connected from the outputs of the ADRRC 80 and which decodes the contents of the ADRRC 80s to generate, in the present implementation of Bus Monitor 12, the address and column select inputs to the memory elements of SSL 50, PSL 52 and XSL 54. Finally, each of SBMI 74, PBMI 76 and XBMI 78 also includes a Register Store (RS) 84 having data inputs connected from the outputs of the respective ADRRC 80s and data outputs connected to CPUBUS 22, so that the contents of the ADRRC 80s may be read to CSS 14 through CPUBUS 22.

B.3 Control and Timing, Register and Memory Elements

Adjacent to the BMIs 46 are two generalized control and timing elements, Register/Silo Control/Decode (RSCD) 86 and Control and Timing (CNTLTMG) 88, which was referred to just above in the description of the BMIs 46. These elements are primarily used to control the reading and writing of the registers of the BMIs 46, just described, the memory elements of SSL 50, PSL 52 and XSL 54, SOR 72 and other registers and memory elements of Bus Monitor 12 which will be described in detail further below. RSCD 86 is connected from CPUBUS 22 to receive and decode addresses and operations commands from CSS 14, such as the addresses and commands to write an address into a BMI 46 or to read information from an address in one or more of the elements of Silo Bank 40, and to provide the corresponding control outputs to the elements of Bus Monitor 12, including CNTLTMG 88. CNTLTMG 88, as its name implies, provides the detailed control and timing signals to the register and memory elements of Bus Monitor 12, in particular the memory elements of SSL 50, PSL 52 and XSL 54. As indicated, CNTLTMG 88 has an input from a Trigger output of the trigger detection logic, described in detail in the following, for the purpose of controlling the writing of data from the selected sample points into SSL 50, PSL 52 and XSL 54, and a time stamp, when, as previously described, Bus Monitor 12 detects a selected trigger condition. The design and operation of RSCD 86 and CNTLTMG 88 are conventional and determined at the detailed level by the operations of Bus Monitor 12, which will be described in detail in the following, and the particular circuits chosen for the individual register and memory elements of Bus Monitor 12. As such, and because the design of such as RSCD 86 and CNTLTMG 88 are well known to those of ordinary skill in the art, RSCD 86 and CNTLTMG 88 will not be described in further detail.

B.4 Trigger Control 38

The primary elements comprising Trigger Control 38 are shown in the lower right portion of FIG. 2 and include Trigger Enable Register (TRIGENR) 90, Trigger Memory (TRIGMEM) 92, Illegal/Error Condition Detector (ILGL/ER) 94, Trigger Detector Logic (TRIGDET) 96, Trigger Registers (TRIGREG) 98 and Time Stamp Counter (TSC) 100. As will be described below, the outputs from TRIGMEM 92, ELGL/ER 94 and the inputs from EXTTRG 42 are trigger signals representing the occurrence of conditions being monitored while TRIGENR 90 stores information, in the form of trigger enabling codes, determining what particular monitored conditions will result in a sampling trigger while. TRIGDET 96 and TRIGREG 98 compare the triggers representing the occurrence of conditions being monitored with the present and previous trigger condition inputs from TRIGENR 90 and generate a trigger output, TRIGS, when a set of monitored conditions match the criteria stored in TRIGENR 90.

Figure 3:
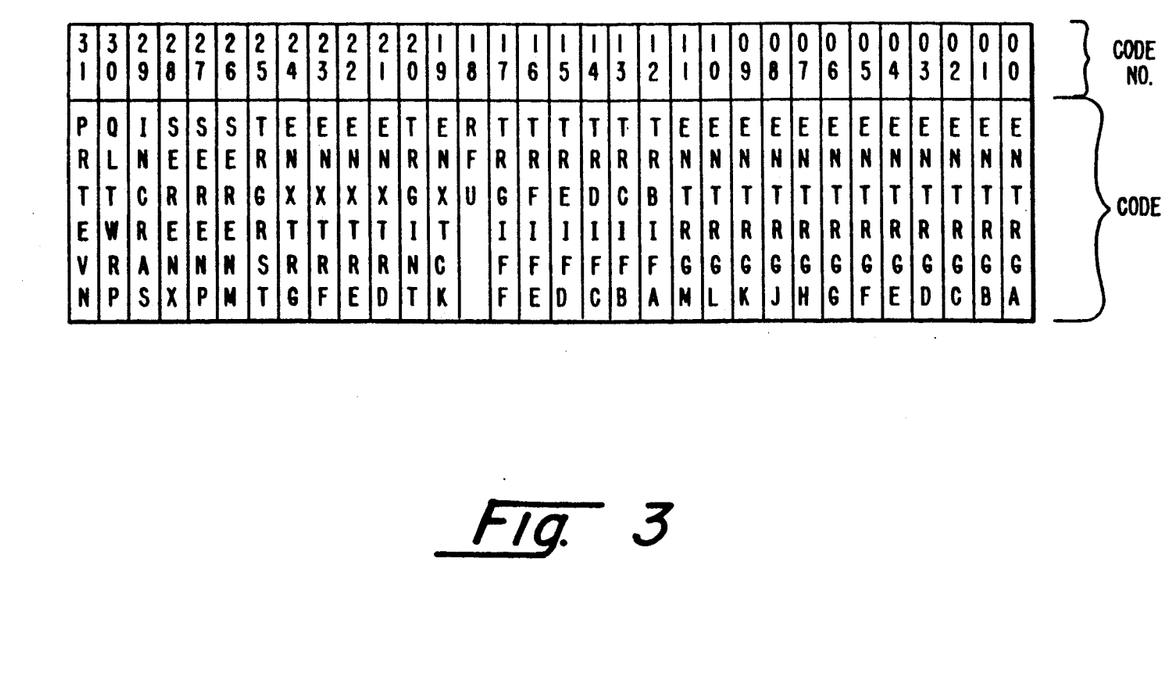
FIG. 3 is a diagrammatic representation of the trigger enabling means of the present invention.

B.4.1 TRIGNER 90 (FIG. 3)

As shown, TRIGENR 90 has data inputs connected from CPUBUS 22 and receives and stores a set of programmably selectable trigger enable control codes, each of which represents a particular monitored condition or combination of monitored conditions which will result in a trigger output from TRIGDET 96 and TRIGREG 98, or a time sequential combination of triggers which will result in such a trigger output. As will be described, such a trigger output of TRIGDET 96 and TRIGREG 98 results in the sampling, and storage in the appropriate portion of Silo Bank 40, of the conditions then present on the selected sampling points in System 10. The trigger output may also cause an interrupt to be provided to CPU 28, and will determine which of the silo units comprising Silo Bank 40, SSL 50, PSL 52, or XSL 54, is to receive and store information.

The trigger enable control codes implemented in the present embodiment of TRIGENR 90 include 16 enabling codes that relate directly to 16 corresponding trigger inputs provided to TRIGDET 96 from the monitored points in System 10, and other codes which define, as trigger conditions, certain combinations or sequences of those 16 trigger conditions. As will be described, TRIGENR 90 may also store other enabling codes to cause TRIGDET 96 and TRIGREG 98 to generate other control signals to Bus Monitor 12, such as an output to transfer a command stored in ITPR 48, such as a CSS 14 interrupt command, onto SYSBUS 18.

Referring to FIG. 3, therein is shown a diagrammatic representation of TRIGENR 90 as presently implemented. As shown, TRIGENR 90 may contain up to 32 enabling codes, most of which are concerned with enabling certain triggers and sequence or combinations of triggers.

Starting at the right of TRIGENR 90, the first block of codes are a set of 12 trigger enable codes (Enable TRiGger ?), ENTRGA through ENTRGM, for enabling Bus Monitor 12 to respond to, respectively, each of Triggers A through M. Of these codes, the first 8 Trigger Enable Codes, ENTRGA through ENTRGH, relate to conditions on SYSBUS 10. Each of trigger enable codes ENTRGA through ENTRGH correspond, respectively, to one of 8 Triggers, A through H, inclusive, generated, as will be described, by TRIGMEM 92. Each of Triggers A through H in turn corresponds to a programmably selectable combination of states on the 80 lines comprising the command, address and data bits of 80 bit SYSBUS 18. ENTRGA through ENTRGH are each one bit codes that determine whether the corresponding trigger will cause recording of the occurrence of a given corresponding trigger condition detected through TRIGMEM 92.

The remaining three enabling codes of this block, ENTRGJ, ENTRGK and ENTRGL, are single bit enabling codes which correspond respectively to Triggers J, K and L, which are generated from ILGL/ER 94 and which are devoted to error conditions and illegal conditions occurring on the buses of System 10 and to such conditions as a timeout condition of SYSBUS 18.

In particular, Trigger J is generated whenever any error is detected on SYSBUS 18 or PBUS 20, the existence of such an error usually being signaled by separate error detection circuitry associated with or in the System 10 elements controlling bus operations.

Trigger K is devoted to error conditions appearing on SYSBUS 18 or in the operations of SYSBUS 18, for example, the appearance of multiple, incompatible responses, such as the concurrent appearance of Acknowledge and Not Acknowledge signals on the SYSBUS 18 command lines. Trigger L is similarly devoted to the operation of SYSBUS 18 and, in particular, to indicating timing problems on SYSBUS 18, such as a timeout condition arising from a bus operation which does not complete within the allowed time.

The enabling code ENTRGM is not associated with a particular condition of System 10 or any of the triggers described just above, but enables Bus Monitor 12 to record every SYSBUS 18 cycle of operation into Silo Bank 40, rather than only recording cycles accompanied by one or more of the trigger conditions described herein.

The next set of 6 one bit per trigger enabling codes (TRigger ? IF ?), TRBIFA, TRICIFB, TRIGDIFC, TRIGEIFD, TRIGFIFE and TRIGIFF allow a user to define a trigger output dependent upon the sequential occurrence of one or more previous triggers of the group Trigger A through F, that is, to detect the occurrence of two to seven trigger conditions in a sequence. For example, if TRBIFA is set as true, then the condition causing Trigger B can be detected, and Trigger B generated, only if the condition causing Trigger A has already been detected and Trigger A generated.

In the present implementation of Bus Monitor 12, these multi-level, or multiply enabled, triggers always "begin" with Trigger G and progress upwards towards Trigger A. In addition, the enabling codes ENTRGA through ENTRGG of the triggers included in the sequence must be set as true to enable the precedent and final trigger conditions of the desired sequence to be detected. For example, a two condition trigger would require that (TRGIFF)(ENTRGF)(ENTRGG) be all set as true: TRIGIFF is true so that final trigger condition Trigger G will occur only if precedent Trigger F has occurred, ENTRGF is true to enable precedent Trigger F, and ENTRGG is true to enable the final Trigger G. Similarly, a three condition trigger would require that (TRFIFE)(TRGIFF)(ENTRGE)-(ENTRGF)(ENTRGE) to make the final Trigger G dependent upon preceding Triggers E and F and to enable the occurrence of Triggers G, F and E. It should be noted that the present requirement of preceding from Trigger G upwards towards Trigger A is not an actual limitation on the possible sequences that may be constructed in that Triggers A through G may be individually assigned to any selected conditions that are to be detected; that is, the sequential alphabetical designation of Triggers A through G is purely a nomenclature convention and implies no limitations on the assignment of the triggers to trigger conditions or the sequence of trigger conditions. It should be further noted that TRIGIFF operates as an enabling code for the sequential operation in general and that, if TRIGIFF is not set true, any of Triggers A through H may be generated when the corresponding conditions occur.

Going out of sequence with the order of the enabling codes listed in TRIGENR 90, each of the four enabling codes (ENable eXternal TRigger ?) ENXTRD, ENXTRE, ENXTRF and ENXTRG are associated with a corresponding one of External Triggers XD, XE, XF, and XG from EXTTRG 42. These four external triggers operate together with their respective four corresponding internal triggers provided from TRIGMEM 92, Triggers D, E, F and G, in a number of different ways.

Firstly, any of Triggers XD, XE, XF or XG may be used in place of, that is, in substitution for, the corresponding one of Triggers D, E, F or G by disabling the Trigger D, E, F or G by programming "don't care" codes in TRIGMEM 92, as described in a following description of TRIGMEM 92, and setting the enabling code of the Trigger XD, XE, XF or XG. The Trigger XD, XE, XF or XG will then operate in place of the Trigger D, E, F or G.

Secondly, any of Triggers XD, XE, XF or XG may be used with the corresponding Trigger D, E, F or G in an AND type operation by appropriately programming the Trigger D, E, F or G in TRIGMEM 92, as described, and setting the enabling codes for both the Trigger XD, XE, XF or XG and the corresponding Trigger D, E, F or G. As was described and will be described further with respect to TRIGMEM 92, Triggers D, E, F and G are each generated as a result of 80 bit conditions appearing on the lines of SYSBUS 18; the use of Triggers XD, XE, XF and XG allows those 80 bit conditions to be extended to 81 bit conditions, wherein the $81^{st}$ bit represents a non-SYSBUS 18 condition, that is, an external trigger condition.

Thirdly, any of Triggers XD, XE, XF or XG may be used separately from the corresponding ones of Triggers D, E, F or G by setting the enabling codes for the selected ones of Triggers XD, XE, XF or XG and Triggers D, E, F or G and, contrary to the first case described just above, programming the Triggers D,E, F or G in TRIGMEM 92 with active codes rather than with "don't care" codes. This application of the external triggers will generate an OR type function, that is, and for example, a trigger on either Trigger XF OF Trigger F.

Lastly, Triggers XD, XE, XF and XG may be employed in any of the above described manners in the generation of sequential trigger conditions as described with reference to enabling codes TRBIFA, TRICIFB, TRIGDIFC, TRIGEIFD, TRIGFIFE and TRIGIFF. This use of the external triggers would allow a sequential trigger condition to be constructed which would require, for example, the appearance of Trigger XF rather than Trigger F in the sequence, or the reverse, or the occurrence of both Triggers XF and F in the sequence.

The remaining codes of TRIGENR 90 are not directly concerned with the generation of triggers, but are used to control and enable other operations and functions of Bus Monitor 12 and System 10.

For example, ENXTCK (ENable eXTernal ClocK) is a code which enables a clock associated with the triggers from EXTTRG 42 to copy conditions from EXTTRG 42, such as cycles on a bus to which the inputs from EXTTRG 42 are connected, into XSL 54.

TRGINT (TRigger INTerrupt) is an enabling code which, if set as true, will cause CPU 28 to interrupt the operations of CSS 14 when Bus Monitor 12 detects Trigger G or when TRGIFF is not true and any trigger of Triggers A through L are detected. This interrupt is usually implemented through an interrupt command stored in ITPR 48 and transferred onto SYSBUS 18 upon the enabled trigger condition.

TRGRST (TRigger ReSeT) enables Trigger Control 38 to reset the TRIGREG 98 registers storing Triggers A through F at the end of each SYSBUS 18 cycle so that, so long as TRGRST is set, Triggers A through F may be detected and recorded each SYSBUS 18 cycle.

SERENM (SERial ENable Memory) controls the clock that writes information from SYSBUS 18 into SSL 50. When this enabling code is not set, nothing may be written into SSL 50; this code will typically be set when System 10's buses, in particular SYSBUS 18, are being monitored, and not set when CSS 14 is reading the contents of Silo Bank 40. Enabling codes SERENP and SERENX similarly control the writing of information into, respectively, PSL 52 and XSL 54.

INCRAS (INCRement Address Store) is an enabling code which, when set, allows Bus Monitor 12 to increment the Silo Bank 40 addresses stored in the ADRRC 80s of SBMI 74, PBMI 76 and XBMI 78 when Bus Monitor 12 is recording data into SSL 50, PSL 52 and XSL 54. INCRAS is reset when the recording of data has stopped and the information stored in Silo Bank 40 is being examined or processed.

Finally, enabling codes QLTWRP and PRTEVN are codes used in the testing of System and and Bus Monitor 12. QLTWRP (Quality Test Wraparound Mode) causes Bus Monitor 12 to respond only to trigger conditions resulting from System 10 bus operations initiated by Bus Monitor 12. PRTEVN (Parity Even) is sued to force test conditions on SYSBUS 18 by causing all parity bits on SYSBUS 18 to be set for even parity.

B.4.2 Trigger Condition Inputs: EXTTRG 42, ILGL/ER 94

As shown, the trigger enable outputs of TRIGENR 90 are connected to a first set of inputs of TRIGDET 96. A second set of TRIGDET 96 inputs are connected from the outputs of TRIGMEM 92 and from ILGL/ER 94 and EXTTRG 42. This second set of inputs to TRIGDET 92 comprise the set of System 10 conditions which are monitored by Trigger Control 38. As described, some of this set of monitored condition inputs, such as those from EXTTRG 42, are connected directly from the trigger condition sources while others, such as the inputs from TRIGMEM 92 and ILGL/ER 94, are generated indirectly from the monitored conditions.

First considering the inputs from EXTTRG 42, these inputs are referred to as "external" in that they are from points outside of SYSBUS 18 and PBUS 20 and are connected directly from those points to TRIGDET 96 without further processing or logic operations being performed on these inputs. As described, these inputs to TRIGDET 96 comprise Triggers XD, XE, XF and XG and may be from, for example, points in Memory 16, CPU 28 or CSS 14 in general, various other system elements connected from SYSBUS 18, or even from points or devices external to System 10, such as peripheral devices or other systems, or any other points selected by the user of Bus Monitor 12.

The inputs of ILGL/ER 94 are connected from both SYSBUS 18 and PBUS 20 and from other devices and elements of System 10 which would be monitored in the normal course of such monitoring operations. These inputs are devoted, in particular, to error conditions occurring at these points in the system, and to detecting defined error conditions on SYSBUS 18 and PBUS 20. In the present implementation, ILGL/ER 94 is comprised of combinatorial logic embodied, for example, as a programmable logic array, which accepts these inputs and generates a set of triggers representing error conditions.

Two outputs of ILGL/ER 94, Triggers J and K, are generated from inputs connected from, respectively, the command and control lines of SYSBUS 18 and PBUS 20 and represents specific error conditions on SYSBUS 18 or PBUS 20, providing Trigger J or K when such a condition occurs. Examples of such bus error conditions may include command signals indicating the occurrence of multiple, incompatible responses on a bus, such as simultaneous acknowledge and not acknowledge signals, simultaneous not acknowledge and wait signals, simultaneous acknowledge and wait signals; the occurrence of improper timing conditions on a bus, such as a short response or short disconnect condition; or the occurrence of a bus lock state while a bus command response is pending.

Finally, ILGL/ER 94 generates Trigger L to indicate timing errors in System 10, specifically in system bus operations. The inputs generating Trigger L are connected from the various devices of System 10 which control system bus operations, for example, any of the devices having bus control capabilities for SYSBUS 18 or PBUS 20. Trigger L is generated as an output whenever a such device detects a timeout condition, that is, that a current bus operation has not completed within the normally allowed time.

B.4.3 Trigger Condition Inputs: TRIGMEM 92

Referring finally to TRIGMEM 92, as was described, the trigger enable codes provided from TRIGENR 90 include 8 codes, ENTRGA through ENTRGH, relating to conditions on SYSBUS 10. Each of these trigger enable codes corresponds respectively to one of 8 Triggers, A through H, inclusive, each of which in turn corresponds to a programmably selectable combination of states on the 80 lines comprising the command, address and data bits of 80 bit SYSBUS 18. These 8 Triggers A through H are provided from TRIGMEM 92 and are individually and programmably selectable.

As shown in FIG. 2, TRIGMEM 92 is a dual port memory. The first port of TRIGMEM 92 is comprised of a first address input, Condition Address Input (CA), and a memory data input, Condition Data Input (CDI), which are both connected from CPUBUS 22. The second port of TRIGMEM 92 is comprised of a second address input, Trigger Address (TA), which is connected from the lines of SYSBUS 18, and the TRIGMEM 92 data output, Trigger Data Output (TDO), which is connected to trigger inputs of TRIGDET 96.

TRIGMEM 92 is functionally eight bits wide, with each bit corresponding to one of Triggers A through H, and stores patterns of Trigger bits A through H corresponding to the SYSBUS 18 conditions to be detected. Each such pattern of Trigger bits A through H occupies a TRIGMEM 18 location whose address corresponds to the particular combination of SYSBUS 18 bits representing the corresponding SYSBUS 18 condition to be detected. The presence on SYSBUS 18 of a condition which has been selected to be monitored will, because the signals present on the lines of SYSBUS 18 are connected to the second port address input TA of TRIGMEM 92, result in the addressing and reading from TRIGMEM 92 of the pattern of Triggers A through H which have been selected to correspond to that particular SYSBUS 18 condition.

The Trigger bit patterns are generated or provided from CSS 14 and are written into the appropriate TRIGMEM 92 address locations by CSS 14 acting through the first port of TRIGMEM 92, that is, through TRIGMEM 92's CA and CDI. These trigger patterns may, for example, be generated under control of software executing in CSS 14, or may be loaded from an outside source under control of CSS 14, or may be stored in CSS 14's EPROM 34 and selected from EPROM 34 and written into TRIGMEM 92 under control of CSS 14.

Thereafter, and while Bus Monitor 12 is monitoring the activities on SYSBUS 18, the bits present on the command, address and data lines of SYSBUS 18 are provided as read addresses to the address input of TRIGMEM 92's second port, that is, to TA. When the combination of bits present on the lines of SYSBUS 18 corresponds to a SYSBUS 18 condition to be detected, the pattern of Trigger bits A through H selected for that particular SYSBUS 18 condition, and stored in the TRIGMEM 92 address location corresponding to that combination of address input bits from SYSBUS 18, will be read from TRIGMEM 92 and to TRIGDET 96, thereby generating the selected ones of Triggers A through H.

As was previously described, SYSBUS 18 of the System 10 incorporating the present invention contains up to 80 lines. These 80 lines comprise 32 address bits, 7 miscellaneous bits used for various functions, 32 data bits, and 8 command bits.

TRIGMEM 92 of the present implementation is comprised of 8 dual port sub-memories and an 8 part AND function. The 80 address input lines from SYSBUS 18 are divided into 8 10-bit fields and the Trigger patterns are correspondingly divided into 8 8-bit sub-trigger fields wherein each sub-trigger field occupies one of Sub-Memories 102 through 116 and contains positions corresponding to each of Triggers A through H. TRIGMEM 92 detects the equivalence of a combination of bits on SYSBUS 18 with a trigger pattern stored in the 8 sub-memories 102–116 by associating each 10-bit address sub-field from SYSBUS 18 with a location in each of the 1024×8 submemories of TRIGMEM 92. The content of each such trigger sub-field location in the sub-memories will contain logic ones in the appropriate Trigger positions if the SYSBUS 18 address sub-field corresponds to a SYSBUS 18 condition to be detected, or if the particular trigger subfield is determined to be a "don't care" condition. If all eight trigger sub-fields contain a logic 1 in the location addressed in the TRIGMEM 92 sub-memories, these 1s will be detected by the AND function and the appropriate ones of Triggers A through H provided to TRIGDET 96.

To illustrate, assume that TRIGMEM 92 is to provide Trigger A as an output when the condition
(a)00010000 (b)00000000 (c)10000000 (d)00000000 (e)11000000
(f)00000000 (g)11111111 (h)00110000 (i)00000000 (j)11100011
occurs on SYSBUS 118 occurs. The trigger pattern for this condition will then comprise:

(a) a 1 in Trigger A position at Sub-Memory address 00010000;

(b) a 1 in Trigger A position at Sub-Memory address 00000000;

(c) a 1 in Trigger A position at Sub-Memory address 10000000;

(d) a 1 in Trigger A position at Sub-Memory address 00000000;

(e) a 1 in Trigger A position at Sub-Memory address 11000000;

(f) a 1 in Trigger A position at Sub-Memory address 00000000;

(g) a 1 in Trigger A position at Sub-Memory address 11111111;

(h) a 1 in Trigger A position at Sub-Memory address 00110000;

(i) a 1 in Trigger A position at Sub-Memory address 00000000; and, (j) a 1 in Trigger A position at Sub-Memory address 11100011.

When the bits, or condition, expressed above appears on the 80 lines of SYSBUS 118, a logic 1 will appear at the Trigger A position outputs of all of the sub-memories and the AND function will accordingly provide a Trigger A output from TRIGMEM 92.

B.4.4 TRIGDET 96 and TRIGREG 98

In its most basic aspect, TRIGDET 96 is an AND-/OR function which compares the triggers provided from EXTTRG 42, ILGL/ER 94 and TRIGMEM 92 with the trigger enable codes provided by TRIGENR 90 and provides a trigger output, TRIGS, whenever there is a concurrence of a SYSTEM 10 condition, as evidenced by a corresponding Trigger, and a trigger enable code. In this aspect, TRIGREG 98 is provided to latch and store the Triggers causing the TRIGS output so that, as previously described, the Trigger or Triggers causing TRIGS may be stored in Silo Bank 40, together with the sample data from the various sampling points in System 10.

In addition, however, and as described, certain Triggers may result from the time sequential occurrence of others of Triggers A through H and XD through XH. For this reason, TRIGREG 98 stores not only the Trigger or Triggers directly causing TRIGS, but the sequential occurrence of Triggers and provides this information back to TRIGDET 96. TRIGDET 96 will, in turn, generate a TRIGS upon the occurrence of a specified sequence of Triggers when such has been specified and enabled by the trigger enable codes.

In as much as the detailed design of and implementation of the logic necessary to perform the functions of TRIGDET 96 and TRIGREG 98, and the necessary operations performed by TRIGDET 96 and TRIGREG 98 are fully described and defined by the other portions of this description of Bus Monitor 12, such as the descriptions of TRIGENR 90 and the enabling codes stored therein and TRIGMEM 92 and the trigger patterns stored therein, TRIGDET 96 and TRIGREG 98 will not be described further herein.

B.4.6 Interrupt/Pattern Programmable Registers 48

As described above, the TRIGS output generated by TRIGDET 96 and TRIGREG 98 initiates the recording of data from SYSBUS 18, PBUS 20 and the sources of EXTTRG 42 into Silo Bank 40. In addition, and as previously described, Bus Monitor 12 includes a set of Interrupt/Pattern Programmable Registers (IPPR) 48 connected from CPUBUS 22 and to SYSBUS 18. As was described, IPPR 48 may be used by CSS 14 in a first mode to test SYSBUS 18 and system elements connected from SYSBUS 18 by allowing CSS 14 to write test patterns onto SYSBUS 18 through IPPR 48 under the control of CSS 14.

In the bus monitoring mode, CSS 14 may write selected commands into IPPR 40, such as a system or CPU interrupt command. These commands will reside in IPPR 40 until the occurrence of a TRIGS output from TRIGDET 96 and TRIGREG 98 and will be transferred onto SYSBUS 18 at that time. In the present implementation of Bus Monitor 12, this command is most usually a CPU 28 interrupt command that will suspend the operation then being executed by CPU 28, so that Monitor 12 may interrupt the operation of System 10.

This interrupt command appears on SYSBUS 18, and at the end of the SYSBUS 18 cycle, which is terminated by the command. The block of information stored in SSL 50 in association with the events related to the monitored condition causing the trigger will, in this case, begin with the trigger itself and the then present conditions on SYSBUS 18 that were sampled as a result of that trigger condition, such as the states present on the lines of SYSBUS 18 during that SYSBUS 18 cycle, and will conclude with the interrupt command as the final entry, the interrupt command having been the final set of conditions, or state, appearing on SYSBUS 18. In order to assist in correlating the data entries recorded in the three silo banks, SSL 50, PSL 52 and XSL 54, the interrupt command is also copied into the time stamp silo of PSL 52 and XSL 54, that is, into PTSL 66 and XTSL 70, if these silos are recording the event in which the interrupt command occurs.

B.4.7 Time Stamp

As was previously mentioned, Trigger Control 38 includes a Time Stamp Generator (TSG) 100 which is essentially a counter and which is initiated upon and by the occurrence of a TRIGS from TRIGDET 96 and TRIGREG 98. The count output of TRG 100 is written into SSL 50 at the start of each sampling operation after the occurrence of a trigger and is provided so that a user of Bus Monitor 12 may determine the relative times of occurrence of each trigger condition. The least significant bits of the count from TRG 100 are also written into PSL 52 and XSL 54, depending upon which of the portions of Silo Bank 40 are recording data in a given sampling operation of Bus Monitor 12, to aid in correlating the data stored in SSL 50, PSL 52 and XSL 54.

The recording of the time stamp count in SSL 50 and portions of the time stamp count in PSL 52 and XSL 54 is desirable because the writing of sampled data into the three subbanks of Silo Bank 40 are not correlated in themselves. That is, and for example, the various monitoring and sampling operations do not all result in data being written into all three portions of Silo Bank 40 in each operation, so that the blocks of information occupying similar address locations in the three subbanks of Silo Bank 40 are not necessarily from the same sampling operation. For example, if SYSBUS 18 is monitored for a condition which is of interest only with respect to SYSBUS 18, the occurrence of that condition would result in data being written only into SSL 50.

In addition, the blocks of data stored in the three subbanks of Silo Bank 40 in the sampling operations are not of equal size. For example, typical SYSBUS 18 operation which results in a trigger condition and the recording of SYSBUS 18 data in SSL 50, such as a SYSBUS 18 command for a data read from Memory 16, occupies only a single SYSBUS cycle and, accordingly, Bus Monitor 12 records only a single SYSBUS 18 cycle of data when a trigger arises from a SYSBUS 18 condition. The operations of PBUS 20 and certain operations reflected by the inputs from EXTTRG 42, however, may occupy more than one SYSBUS 18 cycle. For example, a command for a data read from Memory 16 may occupy only a single SYSBUS 18 cycle, but the actual read of the data from Memory 16 through PBUS 20 will occupy 8 consecutive PBUS 20 cycles, so that, if that particular operation results in a trigger condition and the recording of data into Silo Bank 40, Silo Bank 40 must record the data from one SYSBUS 18 cycle in SSL 50 and the data from 8 consecutive PBUS 20 cycles in PSL 52.

While the invention has been particularly shown and described with reference to a preferred embodiment of the method and apparatus thereof, it will be understood by those of ordinary skill in the art that various changes in form, details and implementation may be made therein without departing from the spirit and scope of the invention as defined by the appended claims.

What is claimed is:

1. In a monitoring means for use in a computer system for selectively detecting and recording signals representing conditions of system operation at selected points within the system during operation, the monitoring means including a trigger generation means connected from a first plurality of selected points and responsive to the signals representing selected conditions for generating corresponding trigger signals representing an occurrence of corresponding selected conditions and a recording memory means connected from a second plurality of selected points and responsive to trigger outputs for recording the conditions present at the second selected points, means for selecting trigger outputs corresponding to the trigger signals, comprising:

trigger code enabling means for storing a plurality of selectable trigger enabling codes,
    wherein each trigger enabling code corresponds to a trigger signal representing the occurrence of a corresponding condition to be detected, and trigger output means connected from the trigger generating means and from the trigger code enabling means and having an output connected to the recording memory means and responsive to the trigger enabling codes and to the trigger signals for providing trigger outputs upon the occurrence of a trigger signal corresponding to a selected trigger enabling code.

2. The monitoring means of claim 1, wherein the first plurality of selected points comprise:
a plurality of signal lines of a first bus of the system.

3. The monitoring means of claim 2, wherein:
the system further includes a means connected from a bus of the system and responsive to signals on a plurality of lines of the bus for providing outputs indicating the occurrence of an illegal or error condition on the bus, and
the first plurality of selected points further comprise the outputs of the means for indicating the presence of an error or illegal condition on the bus of the system.

4. The monitoring means of claim 2, wherein:
the system further includes at least one bus, and
a means connected from points of the system external to the buses of the system for providing trigger signals representing the occurrence of selected conditions external to the buses of the system, and
the first plurality of selected points further comprise the outputs of the means for providing trigger signals representing the occurrence of selected conditions at points external to the buses of the system.

5. The monitoring means of claim 1, wherein:
the system further includes a means connected from a bus of the system and responsive to signals on a plurality of lines of the bus for providing outputs indicating the occurrence of an illegal condition on the bus, and
the first plurality of selected points comprise the outputs of the means for indicating the occurrence of an illegal condition on the bus of the system.

6. The monitoring means of claim 1, wherein:
the system further includes a means connected from a bus of the system and responsive to signals on a plurality of lines of the bus for providing outputs indicating the occurrence of an error condition on the bus, and
the first plurality of selected points comprise the outputs of the means for indicating the presence of an error condition on a bus of the system.

7. The monitoring means of claim 1, wherein:
the system further includes at least one bus, and
a means connected from points of the system external to the buses of the system for providing trigger signals representing the occurrence of selected conditions external to the buses of the system, and
the first plurality of selected points comprise the outputs of the means for providing trigger signals representing the occurrence of selected conditions at points external to the buses of the system.

8. The monitoring means of claim 1, wherein the second plurality of selected points comprises:
a plurality of signal lines of a first bus of the system.

9. The monitoring means of claim 1, wherein the second plurality of selected points comprises:
a plurality of signal lines of a second bus of the system.

10. The monitoring means of claim 1, wherein:
the system further includes at least a first bus and a second bus, and
the second plurality of selected points comprises a set of points external to the first and second buses of the system.

11. The monitoring means of claim 1, wherein the system further includes at least one bus having a plurality of signal lines and the trigger codes comprise:
a plurality of bus enabling codes, wherein
each of the bus enabling codes corresponds to one of a plurality of bus trigger signals, and
each of the bus trigger signals represents the occurrence of signals on the signal lines of a bus of the system corresponding to a selected condition on the bus.

12. The monitoring means of claim 11, wherein one of the bus trigger signals occurs upon each cycle of operation of the bus and a corresponding bus enabling code enables a trigger output upon each bus cycle.

13. The monitoring means of claim 11, wherein the trigger enabling codes comprise:
a plurality of trigger sequence enabling codes, wherein
each of the trigger sequence enabling codes corresponds to a sequential occurrence of a first trigger signal and a second trigger signal from the plurality of bus trigger signals, wherein
a trigger sequence enabling code will enable a trigger output upon the condition that the first trigger signal occurs before the second trigger signal.

14. The monitoring means of claim 13, wherein the second triggering signal occurs next after the first trigger signal.

15. The monitoring means of claim 13, wherein a group of trigger enabling sequence codes set to the enabling state and defining a corresponding group of sequentially defined trigger signals will enable a trigger output upon the occurrence of the trigger signals in the sequence defined by the trigger sequence enabling codes.

16. The monitoring means of claim 13, wherein the trigger enabling codes further comprise:
a plurality of external trigger enabling codes, wherein each external trigger enabling code corresponds to one of a plurality of external trigger signals from a source other than a bus of the system.

17. The monitoring means of claim 16, wherein each external trigger enabling code and corresponding external trigger signal corresponds to one of the bus enabling codes and corresponding bus trigger signal.

18. The monitoring means of claim 17, wherein the bus enabling codes and trigger sequence enabling codes select an external trigger signal to be used in substitution for the corresponding bus trigger signal in generating a trigger output upon the occurrence of a condition defined by one or more trigger sequence enabling codes.

19. The monitoring means of claim 17, wherein the bus enabling codes and trigger sequence enabling codes select an external trigger signal to be used in a logical AND function with the corresponding bus trigger signal in generating a trigger output upon the occurrence of a condition defined by one or more trigger sequence enabling codes.

20. The monitoring means of claim 17, wherein the bus enabling codes and trigger sequence enabling codes select an external trigger signal to be used in a logical OR function with the corresponding bus trigger signal in generating a trigger output upon the occurrence of a condition defined by one or more trigger sequence enabling codes.

21. The monitoring means of claim 11, wherein the trigger enabling codes further comprise:
a plurality of external trigger enabling codes, wherein each external trigger enabling code corresponds to one of a plurality of external trigger signals from a source other than a bus of the system.

22. The monitoring means of claim 21, wherein each external trigger enabling code and corresponding external trigger signal corresponds to one of the bus enabling codes and corresponding bus trigger signal.

23. The monitoring means of claim 21, wherein the bus enabling codes and trigger sequence enabling codes select an external trigger signal to be used in substitution for the corresponding bus trigger signal in generating a trigger output.

24. The monitoring means of claim 21, wherein the bus enabling codes and trigger sequence enabling codes select an external trigger signal to be used in a logical AND function with the corresponding bus trigger signal in generating a trigger output.

25. The monitoring means of claim 21, wherein the bus enabling codes and the trigger sequence enabling codes select an external trigger signal to be used in a logical OR function with the corresponding bus trigger signal in generating a trigger output.

26. The monitoring means of claim 1, wherein the trigger enabling codes comprises:
a plurality of trigger sequence enabling codes, wherein
each of the trigger sequence enabling codes corresponds to a sequential combination of a first trigger signal and a second trigger signal, wherein
a trigger sequence enabling code will enable a trigger output upon the condition that the first trigger signal occurs before the second trigger signal.

27. The monitoring means of claim 26, wherein the second trigger signal occurs next after the first trigger signal.

28. The monitoring means of claim 26, wherein a group of trigger sequence enabling codes set to the enabling state and defining a corresponding group of sequentially defined trigger signals will enable a trigger output upon the occurrence of the trigger signals in the sequence defined by the trigger sequence enabling codes.

29. The monitoring means of claim 1, wherein the trigger enabling codes comprise:
a plurality of external trigger enabling codes, wherein
each external trigger code corresponds to one of a plurality of external triggers from a source other than a bus of the system.

30. The monitoring means of claim 1, wherein the trigger enabling codes comprise:
a plurality of error enabling codes, wherein
each of the error enabling codes corresponds to one of a plurality of error trigger signals, and
each one of the error signals represents an error condition on a system bus.

31. The monitoring means of claim 30, wherein the error conditions on a system bus include illegal conditions.

32. The monitoring means of claim 30, wherein the error conditions of a system bus include timeout conditions.

* * * * *